United States Patent
Collins et al.

(10) Patent No.: US 9,348,921 B2
(45) Date of Patent: May 24, 2016

(54) DETERMINING ACCESS TO COMMENTS

(71) Applicant: Google Inc., Mountain View, CA (US)

(72) Inventors: Alexander Collins, San Francisco, CA (US); Jeffrey L. Korn, New York, NY (US); Raoul-Sam Dhun Daruwala, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 227 days.

(21) Appl. No.: 13/645,423

(22) Filed: Oct. 4, 2012

(65) Prior Publication Data

US 2013/0297691 A1     Nov. 7, 2013

Related U.S. Application Data

(60) Provisional application No. 61/641,269, filed on May 1, 2012.

(51) Int. Cl.
 *G06F 15/16* (2006.01)
 *G06F 17/30* (2006.01)
 *G06Q 50/00* (2012.01)

(52) U.S. Cl.
 CPC .......... *G06F 17/30867* (2013.01); *G06Q 50/01* (2013.01)

(58) Field of Classification Search
 None
 See application file for complete search history.

(56) References Cited

U.S. PATENT DOCUMENTS

| 8,156,250 B2* | 4/2012 | Parcher et al. ............... 709/246 |
| 2002/0124053 A1* | 9/2002 | Adams et al. ................ 709/216 |
| 2009/0089686 A1* | 4/2009 | Chen et al. ................... 715/759 |
| 2010/0169363 A1* | 7/2010 | Gaedcke ...................... 707/769 |
| 2010/0205539 A1* | 8/2010 | Gestsson et al. .............. 715/752 |
| 2011/0004922 A1* | 1/2011 | Bono et al. ....................... 726/4 |
| 2011/0154445 A1* | 6/2011 | Schmidt-Karaca et al. ...... 726/4 |
| 2011/0208814 A1* | 8/2011 | Bostrom et al. ............. 709/204 |
| 2013/0018963 A1* | 1/2013 | Brauff et al. ................. 709/206 |
| 2013/0024516 A1* | 1/2013 | Blinder ........................ 709/204 |
| 2013/0246525 A1* | 9/2013 | Patil et al. .................... 709/204 |
| 2013/0340097 A1* | 12/2013 | Gowel ........................... 726/28 |

FOREIGN PATENT DOCUMENTS

AU     2011-101708 A4     3/2012

OTHER PUBLICATIONS

"Access Control—Google Cloud Storage" Google Developers, retrieved from <https://developers.google.com/storage/docs/accesscontrol#/About-Access-Control-Lists>, visited Mar. 23, 2012.

* cited by examiner

*Primary Examiner* — Chris Parry
*Assistant Examiner* — Stephen Houlihan
(74) *Attorney, Agent, or Firm* — McDermott Will & Emery LLP

(57) ABSTRACT

The subject technology discloses configurations for providing comments restricted to a set of users for web content on a web page. In one implementation, a widget is provided that enables a content provider or a user to provide comments restricted to the set of users in a manner that does not disrupt an existing implementation or presentation of publicly viewable web content that already provides public comments from visitors of the web site. In particular, the widget may be provided as a plugin or extension in the user's web browser, or be integrated in the web page by the content provider. The scope of the comments restricted to the set of users are defined by one or more access control lists, which allow the comments restricted to the set of users to be only viewable by a specified set of users (and not viewable by other users).

31 Claims, 8 Drawing Sheets

DETERMINING ACCESS TO COMMENTS

CROSS-REFERENCE TO RELATED APPLICATIONS

The present application claims the benefit of priority under 35 U.S.C. §119 from U.S. Provisional Patent Application Ser. No. 61/641,269 entitled "DETERMINING ACCESS TO COMMENTS," filed on May 1, 2012, the disclosure of which is hereby incorporated by reference in its entirety for all purposes.

BACKGROUND

Some web sites enable visitors (e.g., different users) to provide comments in response to different web content (e.g., videos, articles, etc.). Such comments may be public and available for viewing by a user visiting a web site. As a result, a comment provided by a user is available for viewing by other users visiting the web site.

SUMMARY

The subject technology provides for determining one or more public comments provided in a web page in which the one or more public comments comprise a first format for providing public commenting by one or more viewers of the web page. The first format is native to the web page in some configurations. The subject technology receives comment data in which the comment data is in response to a respective public comment among the determined one or more public comments. A selection of a set of users is received that defines a scope for viewing the received comment data. The set of users is associated with a respective access control list that defines the scope for viewing the received comment data. The scope for viewing the received comment data includes one or more unique users. The set of users includes a single user, a group of users, a set of groups, or an organization. The selection of the set of users includes selecting a group of users. The group of users is defined by social circle in an online social networking service. Further, the subject technology generates a comment restricted to the set of users based on the scope for viewing the received comment data, wherein the generated comment includes a second format for providing commenting restricted to the set of users. The second format provides compatibility with a user's social graph. The first format is incompatible with the user's social graph. The web page is provided by a first service and the user's social graph is provided by a second service. Additionally, the subject technology provides for display the determined one or more public comments and the generated comment in which the generated comment is displayed separately to distinguish from the determined one or more public comments.

Further, the subject technology determines a user corresponding to a current viewer the web page. The user is determined based on one or more login credentials of the current viewer of the web page in one example. The user is determined based on a corresponding online social networking profile in one example. The subject technology determines if the generated comment is available for the determined user based on the scope for viewing the generated comment. The generated comment restricted to the set of users is then provided for display if the generated comment is available for the determined user. In some implementations, the generated comment is associated with a respective access control list that includes a scope for viewing the generated comment data based on the set of users. Additionally, generating the comment restricted to the set of users is implemented in some configurations by generating an entry in a new access control list including a scope for viewing the generated comment data based on the set of users in which the entry associates the comment to the new access control list. The subject technology further determines one or more public comments on the web page, and provides for display the determined one or more public comments in which the displayed public comments are displayed separately from the generated comment.

The subject technology further includes a system. The system includes memory, one or more processors, one or more modules stored in memory and configured for execution by the one or more processors. The system includes a content viewer module configured to determine a user corresponding to a current viewer of web content on a web page. The system further includes a comments module configured to determine one or more public comments provided in the web page in which the one or more public comments comprise a first format for providing public commenting by one or more viewers of the web page. The comments module is further configured to receive comment data in which the comment data is in response to a respective public comment among the determined one or more public comments. The comments module is further configured to receive a selection of a set of users that defines a scope for viewing the received comment data, and generate a comment restricted to the set of users based on the scope for viewing the received comment data in which the generated comment includes a second format for providing commenting restricted to the set of users. The system further includes a graphical user interface (GUI) display module configured to provide for display the determined one or more public comments and the generated comment in which the generated comment is displayed separately to distinguish from the determined one or more public comments. The selection of the set of users comprises selecting a group of users. The group of users is defined by social circle in an online social networking service. The first format is native to the web page. The second format provides compatibility with a user's social graph. The web page is provided by a first service and the user's social graph is provided by a second service. The first format is incompatible with the user's social graph.

The comments module is further configured to determine if the generated comment is available for the determined user based on the scope for viewing the generated comment. The GUI display module is further configured to provide for display the generated comment restricted to the set of users if the generated comment is available for the determined user. The generated comment is associated with a respective access control list that includes a scope for viewing the generated comment data based on the set of users. The comments modules is further configured to generate an entry in a new access control list including a scope for viewing the generated comment data based on the set of users in which the entry associates the comment to the new access control list. The comments module is further configured to perform a search request of available comments for the web content to determine if the user is included in a respective access control list for viewing a respective comment restricted to the set of users. The GUI display module is further configured to provide for display the determined one or more public comments in which the displayed public comments are displayed separately from one or more comments restricted to the set of users.

Further, the subject technology provides for determining one or more public comments provided in a web page in which the one or more public comments comprise a first format for providing public commenting by one or more viewers of the web page. Comment data is then received in which the comment data is in response to a respective public comment among the determined one or more public comments. The subject technology receives a selection of a set of users that defines a scope for viewing the received comment data in which the set of users includes one or more unique contacts among one or more contacts of a user's social graph. A comment restricted to the set of users based on the scope for viewing the received comment data is generated in which the generated comment comprises a second format for providing commenting restricted to the set of users that is compatible with the user's social graph and incompatible with the first format for providing public commenting.

These and other implementations may provide one or more of the following advantages. For instance, the subject technology enables a conversation to take place between a set of users included in a user's social graph within a web page including one or more public comments, where the web page does not support an interaction with the user's social graph. Consequently, the set of users can provide comments restricted to the set of users from the user's social graph in view of one or more public comments within the same page. Providing such comments on the same web page can provide a more seamless user experience. Thus, a user that creates the conversation can forgo a step of first sharing a public comment(s) to the set of users, and then navigating to a separate page, service or application (e.g., away from the pubic comment) in order view the conversation between the set of users. Additionally, the subject technology can present the conversation in a manner that visually distinguishes the comments restricted to the set of users from the public comments on the same web page.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several configurations of the subject technology are set forth in the following figures.

DETAILED DESCRIPTION

Figure 1:
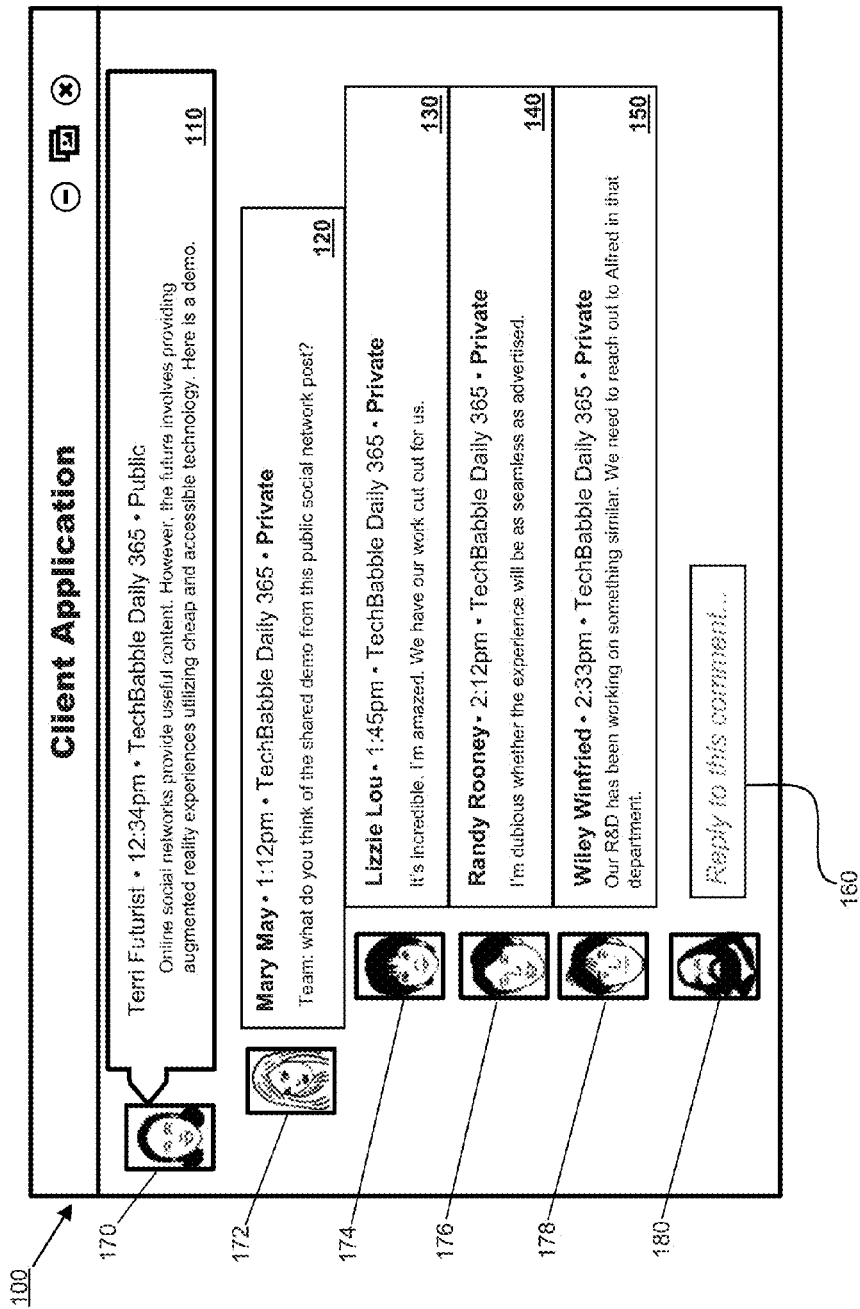
FIG. 1 conceptually illustrates an example graphical user interface (GUI) for providing one or more comments restricted to a set of users.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Some web sites enable visitors (e.g., different users) to provide comments in response to different web content (e.g., videos, articles, etc.). Such comments are typically public and available for viewing by a user visiting a web site. As a result, a comment provided by a user is available for viewing by another user visiting the web site. However, in some instances, a user viewing the web content may wish to provide comments (e.g., in response to a public comment made by another user) that are restricted in scope to a specified group of users. The user in this example does not want other users outside of the restricted scope to view the comments.

In view of the above, the subject technology provides in one implementation a widget for providing comments restricted to a set of users for web content on a web page hosted by a web site. In some instances, the web page may provide one or more public comments. The public comments may be in a native format provided by the web page. However, the web page does not natively support an interaction (e.g., a conversation) between a user and other users from the user's social graph with the one or more public comments. The widget therefore enables a content provider or a user to provide comments restricted to the set of users in a manner that does not disrupt an existing implementation or presentation of web content that already provides one or more public comments from visitors of the web site. In this fashion, the widget enables the user to provide a conversation restricted to other users from the user's social graph within web content that does not natively support interaction with the user's social graph. The widget may be provided as a plugin or extension in the user's web browser, or be integrated in the web page by the content provider. Other implementations can be provided and still be within the scope of the subject technology. The aforementioned set of users (e.g., from the user's social graph) includes a single user, a group of users, a set of groups, or an organization in some implementations.

For posting a comment restricted to a set of users, the widget can present different options to a user for restrict the comment to a certain group of people. For example, the widget can provide for selecting one or more groups (e.g., social circles) defined by a given social networking service that organizes one or more contacts of a user in the social circles. A social circle represents a grouping of one or more contacts from the user's social graph based on a level of trust or a type of relationship, etc. Alternatively, the widget allows the user to manually provide the group of users that are permitted to view the comment restricted to the set of users. In one example, the subject technology associates the comment restricted to the set of users with an access control list that defines the scope for viewing the comment restricted to the set of users based on the selected group of users. The access control list manages a set of permissions for the comment restricted to the set of users (in which permissions define a set of actions that can be performed on the comment restricted to the set of users), including defining a scope for viewing the comment restricted to the set of users.

The comment restricted to the set of users, in one example, is provided in a format that is incompatible with the public comments provided in the web page. More specifically, the public comments in the web page do not provide access to the user's contacts from the user's social graph. For instance, the web page may only provide public commenting between users that are registered to the web site hosting the web page, and such public commenting is unrestricted for viewing to visitors of the web page. In order to allow access to the user's contacts within the social graph, the comment restricted to the set of users is provided in a different format (from the public comments) that is compatible with the user's social graph to allow access to the contacts from the user's social graph. Thus, the subject technology can be understood as providing an importation of the user's social graph to enable commenting on a given web page that does not natively allow access to the contacts from the user's social graph. Further, any comments from the user and/or contacts from the user's social graph are hidden from view from other viewers of the web page to ensure confidentiality of the comments from an unintended viewer.

When another user views the web content on the web page, the subject technology (e.g., widget) performs a search request according to an access control list to determine one or more comments restricted to the set of users which are available for viewing. For instance, the subject technology performs a search request of available comments for the web content to determine if the viewing user is included in a respective access control list for viewing the comments restricted to the set of users. In one example, each comment can be associated with an access control list(s). Comments restricted to the set of users that are available for viewing based on the access control list will be presented by the widget with a different visual indicator (e.g., icon, graphical representation, etc.) to distinguish between one or more public comments. Additionally, the subject technology may perform different filtering techniques (e.g., based on one or more different criteria) to display and/or organize the comments restricted to the set of users from one or more public comments provided in the web page.

Further, in some implementations, when a user replies to an existing comment restricted to the set of users, the additional reply can inherit the scope from the access control list of a top-level comment (e.g., an initial comment restricted to the set of users that is being directly or indirectly replied to in an existing conversation or series of comments restricted to the set of users). In one example, this is implemented as an "annotation" (e.g., data structure, data field, etc.) on the top-level comment in which the reply can only be viewed with the top-level comment, and not separately. Alternatively or conjunctively, a reply to a comment restricted to the set of users will contain a reference to the access control list for the top-level comment. In this manner, the reply is provided in its own annotation and shares an access control list with the top-level comment. As such, two copies of the access control list are provided: one in the top-level comment and one in the reply. However, if the access control list changes in the top-level comment, the change(s) will propagate to the reply. In some implementations, a scope of a comment can be locked by a user. For instance, a user that replies to the top-level comment may wish to disable changes to the scope of the user's reply comment. As a result, if the scope of the top-level comment changes (e.g., from being restricted to the set of users to public), the changed scope is not applied to the user's reply and thus preserves the restricted scope of the user's reply comment. Additionally, the scope of the top-level comment may be locked to disable changes to the scope in some implementations.

FIG. 1 conceptually illustrates a graphical user interface (GUI) 100 in which some configurations of the subject technology can be implemented. As illustrated in the example shown in FIG. 1, comments restricted to a set of users are in response to a publicly viewable comment provided in a web page provided by an online social networking service. More specifically, the GUI 100 can include different sets of graphical elements for providing one or more comments restricted to the set of users. A graphical element can include, but is not limited to, a button, check box, radio button, slider, list box, drop-down list, menu, combo box, icon, text box, scroll bar, etc.

As illustrated in the example GUI 100, different graphical representations 170, 172, 174, 176, 178 and 180 of contacts are shown. The contacts can be contacts in a user's social graph, e-mail contacts, different users of the web page, etc. GUI 100 further includes display areas 110, 120, 130 and 140 that correspond to various comments. For instance, the graphical representation 170 is associated with a public comment shown in the display area 110. The public comment is visible to all viewers of the web page provided by the online social networking service in some configurations. In another example, the public comment can be provided in an online forum hosted by a web site, or associated with an article, video or other web content provided by the web site.

The GUI 100 enables one or more users to submit comments restricted to the set of users in response to the public comment. As further shown, the GUI 100 shows the graphical representation 172 associated with a comment restricted to the set of users shown in the display area 120. The user creating an initial comment restricted to the set of users (e.g., "moderator") is able to assign a scope for viewing the initial comment restricted to the set of users and ensuing replies. The scope can include one or more other users including one or more groups of users that are defined by the online social networking service (e.g., social circles). In one example, the user acting in the role of the moderator can change the scope of comments restricted to the set of users (e.g., the initial comment restricted to the set of users and one or more replies) to either broaden or further restrict the number of users that can view the comments restricted to the set of users.

In the example shown in FIG. 1, users corresponding to the graphical representations 174, 176 and 178 have provided respective comments restricted to the set of users (e.g., in display areas 130, 140 and 150) in response to the initial comment restricted to the set of users shown in the display area 120. Each comment restricted to the set of users is restricted for viewing according to the scope of users assigned to the initial comment restricted to the set of users. In this manner, comments restricted to the set of users are not viewable by each visitor to the web page.

The GUI 100 enables a user (shown as the graphical representation 180) to submit a new comment restricted to the set of users by inputting comment data (e.g., via keyboard input) into a textbox 160. In one example, the graphical representation 180 indicates the current user viewing the web page that can be determined based on the user's login credentials, profile information, etc. In addition to keyboard input, other types of input can be accepted and still be within the scope of the subject technology. For instance, some configuration could accept voice input for submitting a comment restricted to the set of users.

Although the example shown in the GUI 100 illustrates the comments restricted to the set of users in a particular arrangement, other types of arrangements for the comments restricted to the set of users can be provided and still be within the scope of the subject technology. For instance, the GUI 100 can include a graphical element to collapse or expand comments restricted to the set of users. Further, comments restricted to the set of users can be indicated/displayed in different ways (e.g., utilizing different colors, shading, or other graphical indicators, etc.). Additionally, although the GUI 100 includes certain graphical elements, it should be understood that the GUI 100 is not required to include all graphical elements shown in FIG. 1. Moreover, the GUI 100 could include more graphical elements than shown in the example of FIG. 1.

Figure 2:
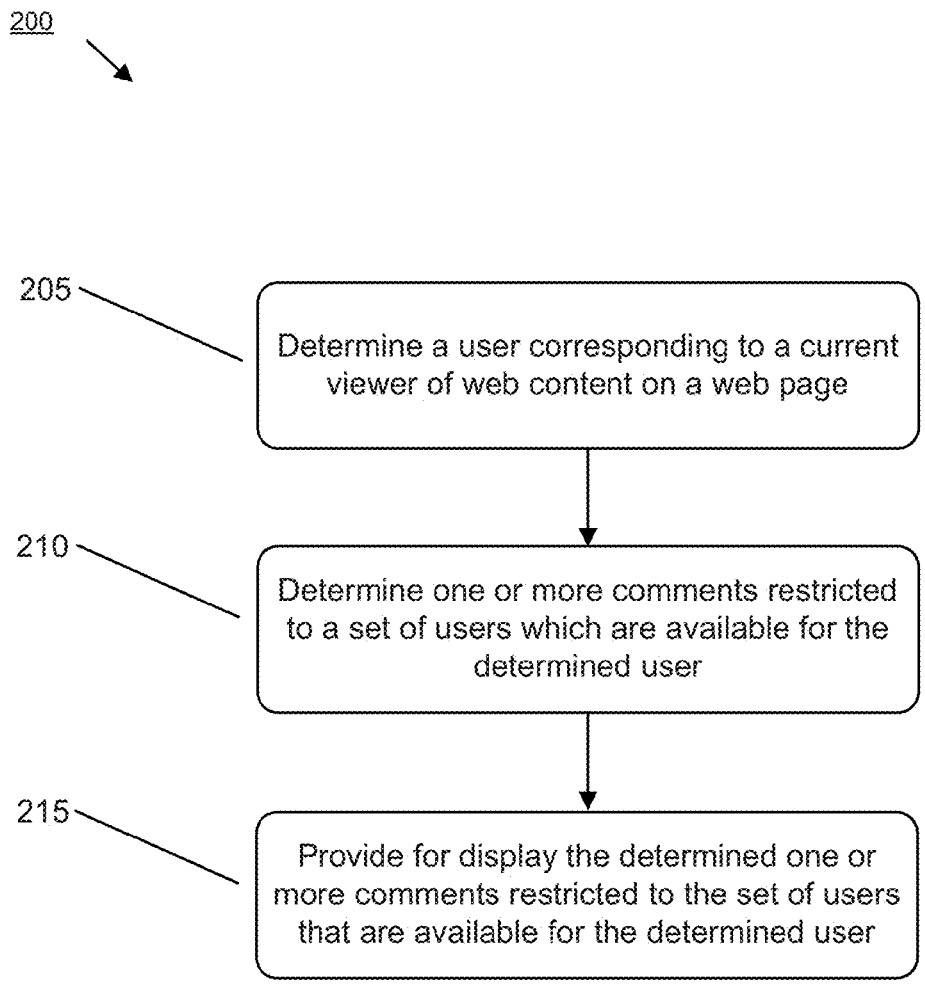
FIG. 2 conceptually illustrates an example process for providing one or more comments restricted to a set of users for web content that is publicly accessible.

FIG. 2 conceptually illustrates an example process 200 for providing one or more comments restricted to a set of users for web content that is publicly accessible. In one example, the set of users includes a single user, a group of users, a set of groups, or an organization. The process 200 can be performed on one or more computing devices in some configurations.

The process 200 begins at 205 by determining a user corresponding to a current viewer of web content on a web page. The web page is enabled for one or more public comments and comments restricted to the set of users in which the web content is available for viewing by each viewer of the web page in some configurations. In one example, the user is determined based on one or more login credentials of the current viewer of the web content. Additionally, the user is determined based on a corresponding online social networking profile in some configurations.

The process 200 at 210 determines one or more comments restricted to the set of users which are available for the determined user in which each comment restricted to the set of users is restricted for viewing to a subset of viewers of the web page. In one example, determining one or more comments restricted to the set of users which are available is accomplished by performing a search request of available comments for the web content to determine if the user is included in a respective access control list for viewing a respective comment restricted to the set of users among the determined comments restricted to the set of users. The determined one or more comments restricted to the set of users are associated with a respective access control list that defines a scope for viewing the comments restricted to the set of users. The scope for viewing the comments restricted to the set of users includes one or more unique users and the determined user.

As described above, the web page may provide one or more public comments. However, the web page does not natively support an interaction (e.g., a conversation) between a user and other users from the user's social graph with the one or more public comments. The subject technology therefore enables a content provider or a user to provide comments restricted to the set of users in a manner that does not disrupt an existing implementation or presentation of web content that already provides one or more public comments from visitors of the web site. In this fashion, the subject technology provides a conversation restricted to other users from the user's social graph within web content that does not natively support interaction with the user's social graph. In one example, the determined comments restricted to the set of users are in response to a respective public comment of the web content. In particular, the respective public comment available for viewing by all viewers of the web content and the determined comments restricted to the set of users restricted for viewing by a scope defined by a corresponding access control list.

The process 200 at 215 provides for display the determined one or more comments restricted to the set of users available for the determined user. The determined one or more comments restricted to the set of users are displayed separately to distinguish from one or more public comments associated with the web content. In some configurations, the process 200 can filter the determined one or more comments restricted to the set of users for display according to one or more criteria. The process 200 then ends.

Figure 3:
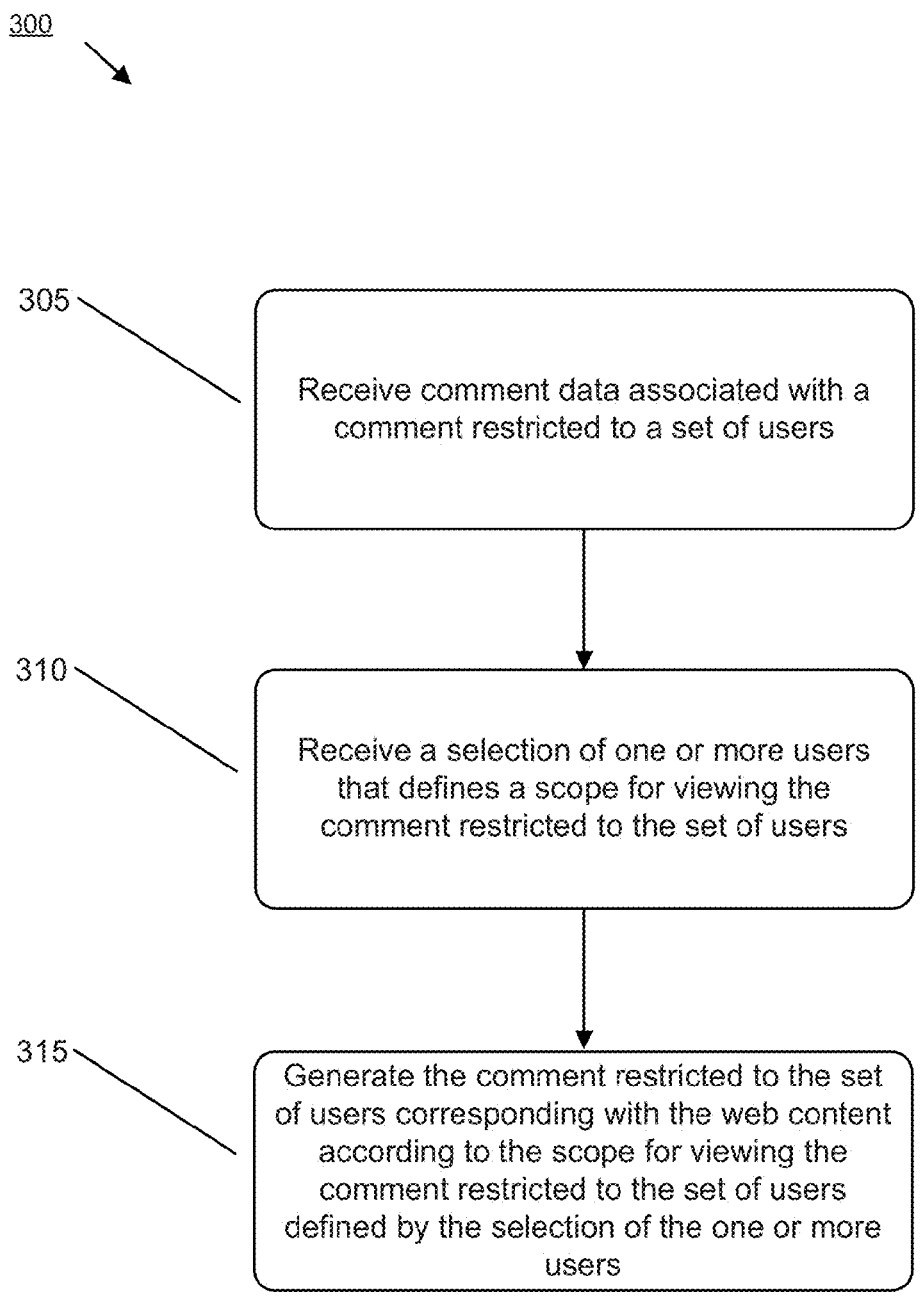
FIG. 3 conceptually illustrates an example process for submitting comments restricted to a set of users to one or more contacts for web content that is publicly accessible.

FIG. 3 conceptually illustrates an example process 300 for submitting comments restricted to the set of users to one or more contacts for web content that is publicly accessible. The process 300 can be performed by one or more computing devices or systems in some configurations.

The process 300 begins at 305 by receiving comment data associated with a comment restricted to the set of users in which the comment restricted to the set of users corresponds with web content provided in a web page. In one example, the comment restricted to the set of users is received via an online submission based on user input (e.g., user entry via a textbox element, etc.).

The process 300 at 310 receives a selection of one or more users that defines a scope for viewing the comment restricted to the set of users in which the comment restricted to the set of users is only available for viewing based on the selection of the one or more users. In some configurations, the scope for viewing the comment restricted to the set of users is included in an access control list that is associated with the comment restricted to the set of users. The selection of one or more users involves selecting a group of users in one example. For instance, the group of users is defined by social circle in an online social networking service.

The process 300 at 315 generates the comment restricted to the set of users corresponding with the web content according to the scope for viewing the comment restricted to the set of users defined by the selection of the one or more users. In one example, generating the comment restricted to the set of users involves generating an entry in a new access control list including the scope for viewing the comment restricted to the set of users in which the entry associates the comment restricted to the set of users to the new access control list. The process 300 then ends.

Figure 4:
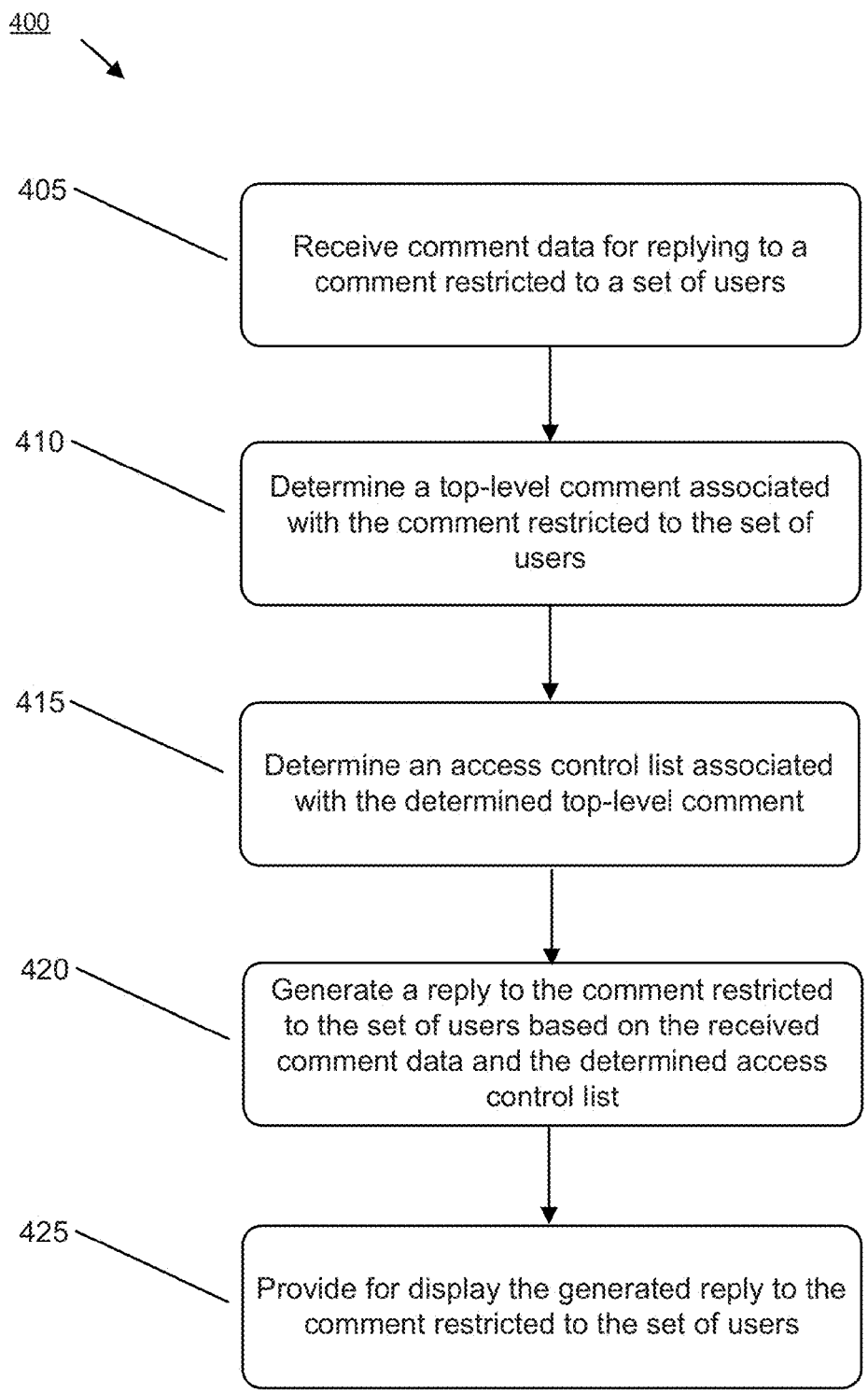
FIG. 4 conceptually illustrates an example process submitting a reply to a comment restricted to a set of users.

FIG. 4 conceptually illustrates an example process 400 submitting a reply to a comment restricted to a set of users. The process 400 can be performed by one or more computing devices or systems in some configurations.

The process 400 begins at 405 by receiving comment data for replying to a comment restricted to the set of users. In one example, the comment data is received via user input provided via an online submission based on user input (e.g., user entry via a textbox element, etc.).

The process 400 at 410 determines a top-level comment associated with the comment restricted to the set of users. In some configurations, the top-level comment is an initial comment restricted to the set of users that starts a conversation thread or series of comments restricted to the set of users.

The process 400 at 415 determines an access control list associated with the determined top-level comment. The process 400 at 420 generates a reply to the comment restricted to the set of users based on the received comment data and the determined access control list.

The process 400 then provides for display at 425 the generated reply to the comment restricted to the set of users. In one example, process 400 displays the reply in a view including the top-level comment. The process 400 then ends.

Figure 5:
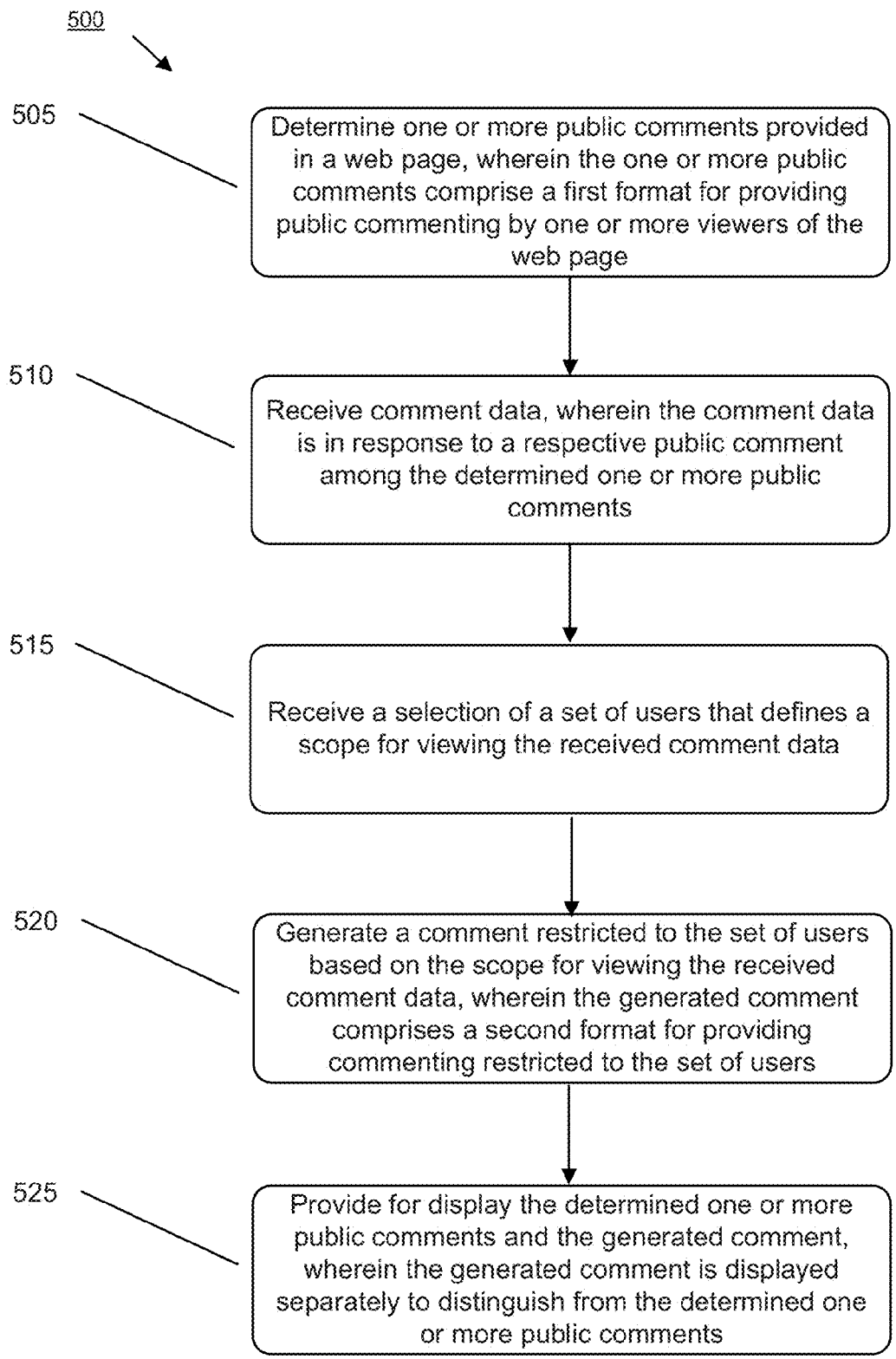
FIG. 5 conceptually illustrates an example process for providing a comment restricted to a set of users in a web page including one or more public comments.

FIG. 5 conceptually illustrates an example process 500 for providing a comment restricted to a set of users in a web page including one or more public comments. The process 500 can be implemented in one or more computing devices in some configurations.

The process 500 begins at 505 by determining one or more public comments provided in a web page, where the one or more public comments include a first format for providing public commenting by one or more viewers of the web page. The first format is native to the web page in one example. For example, a web site hosting the web page may receive and store public comments in a native format for viewing to visitors of the web page. However, the native format does not allow for a visitor of the web page to provide a comment restricted to one or more contacts from the visitor's social graph.

The process 500 at 510 receives comment data, where the comment data is in response to a respective public comment among the determined one or more public comments. For instance, the comment data may be received from input provided by a user.

The process 500 at 515 receives a selection of a set of users that defines a scope for viewing the received comment data. The selection of the set of users includes selecting a group of users in one example. The group of users can be predefined or organized based on a relationship with a user. By way of example, the group of users is defined by social circle in an online social networking service. Other ways to organize the group of users can be provided and still be within the scope of the subject technology.

The process 500 at 520 generates a comment restricted to the set of users based on the scope for viewing the received comment data, where the generated comment is in a second format for providing commenting restricted to the set of users. The second format provides compatibility with a user's social graph in one example. For instance, the aforementioned first format is incompatible with the user's social graph. In this manner, the process 500 provides a transformation of comment data into the second format (different than the first format that is native to the web page) in order to integrate and enable interaction with the user's social graph in the web page. Further, the web page is provided by a first service and the user's social graph is provided by a second service in one example.

In some configurations, the generated comment is associated with a respective access control list that includes a scope for viewing the generated comment data based on the set of users. For instance, generating the comment restricted to the set of users includes generating an entry in a new access control list including a scope for viewing the generated comment data based on the set of users in which the entry associates the comment to the new access control list.

The process 500 at 525 provides for display the determined one or more public comments and the generated comment, where the generated comment is displayed separately to distinguish from the determined one or more public comments. For instance, the generated comment may be displayed to highlight or clearly identify the restricted aspect of the generated comment. The process 500 then ends.

Figure 6:
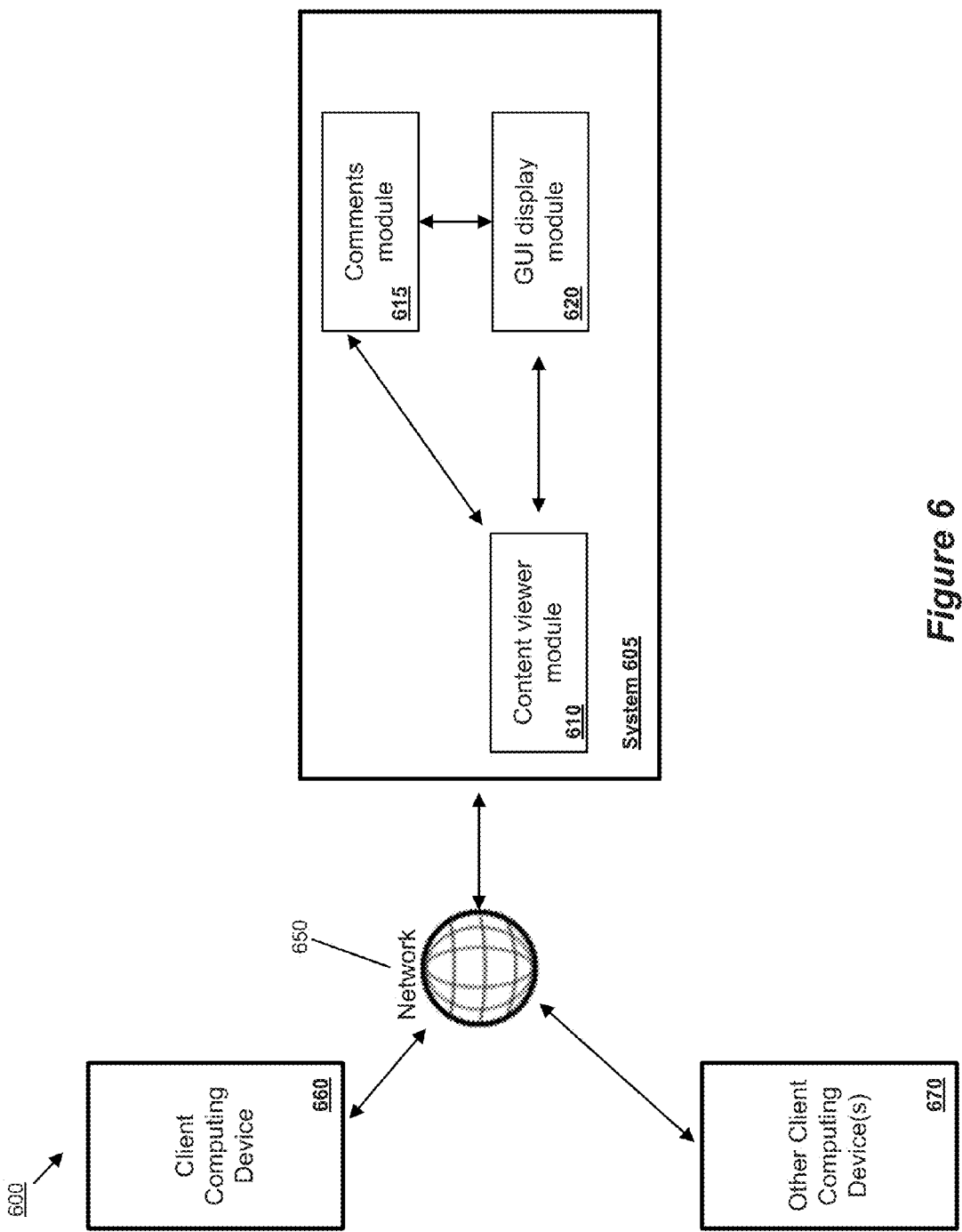
FIG. 6 conceptually illustrates an example computing environment.

FIG. 6 conceptually illustrates an example computing environment 600 including a system. In particular, FIG. 6 shows a system 605 for implementing the above described GUI in FIG. 1 and the processes in FIGS. 2-5. In some configurations, the system 605 is part of an implementation running a particular machine (e.g., client computer, laptop, notebook, netbook, etc.).

The system 605 can include memory, one or more processors, and one or more modules stored in memory and configured for execution by the one or more processors. As shown in FIG. 6, the system 605 includes several modules for providing different functionality. The system 605 is configured to include a content viewer module 610, a comments module 615 and a graphical user interface (GUI) display module 620.

The content viewer module 610 is configured to determine a user corresponding to a current viewer of web content on a web page in which the web page is enabled for one or more public comments and comments restricted to a set of users in which the web content is available for viewing by each viewer of the web page. The user is determined based on a corresponding online social networking profile in one example. The comments module 615 is configured to determine one or more comments restricted to the set of users which are available for the determined user in which each comment restricted to the set of users is restricted for viewing to a subset of viewers of the web page. The GUI display module 620 is configured to provide for display the determined one or more comments restricted to the set of users available for the determined user in which the determined one or more comments restricted to the set of users are displayed separately to distinguish from one or more public comments associated with the web content.

Additionally, the comments module 615 is further configured to perform a search request of available comments for the web content to determine if the user is included in a respective access control list for viewing a respective comment restricted to the set of users among the determined comments restricted to the set of users.

The GUI display module 620 is further configured to filter the determined one or more comments restricted to the set of users for display according to one or more criteria. The comments module 615 is further configured to receive comment data associated with a comment restricted to the set of users in which the comment restricted to the set of users corresponds with web content provided in a web page, receive a selection of one or more users that defines a scope for viewing the comment restricted to the set of users in which the comment restricted to the set of users is only available for viewing based on the selection of the one or more users, and generate the comment restricted to the set of users corresponding with the web content according to the scope for viewing the comment restricted to the set of users defined by the selection of the one or more users.

Additionally, the comments module 615 is further configured to generate an entry in a new access control list including the scope for viewing the comment restricted to the set of users in which the entry associates the comment restricted to the set of users to the new access control list. Moreover, the comments module 615 is further configured to determine one or more public comments of the web content on the web page.

In some configurations, the comments module 615 is configured to receive comment data for replying to a comment restricted to the set of users, determine a top-level comment associated with the comment restricted to the set of users, determine an access control list associated with the determined top-level comment, and generate a reply to the comment restricted to the set of users based on the received comment data and the determined access control list.

The GUI display module 620 is further configured to provide for display the determined one or more public comments in which the displayed public comments are displayed separately from comments restricted to the set of users. Further, the GUI display module 620 is configured to provide for display a generated reply to a comment restricted to the set of users.

In some configurations, the comments module 615 is configured to determine one or more public comments provided in the web page in which the one or more public comments are in a first format for providing public commenting by one or more viewers of the web page. The first format is native to the web page in one example. The comments module 615 is further configured to receive comment data in which the comment data is in response to a respective public comment among the determined one or more public comments. The comments module 615 is also configured to receive a selection of a set of users that defines a scope for viewing the received comment data, and generate a comment restricted to the set of users based on the scope for viewing the received comment data in which the generated comment is in a second format for providing commenting restricted to the set of users. The second format provides compatibility with a user's social graph. The web page is provided by a first service and the user's social graph is provided by a second service in one example. The first format is incompatible with the user's social graph in some configurations. The selection of the set of users includes selecting a group of users in one example. The group of users is defined by social circle in an online social networking service in one example. The GUI display module 620 is configured to provide for display the determined one or more public comments and the generated comment in which the generated comment is displayed separately to distinguish from the determined one or more public comments.

The comments module 615 is further configured to determine if the generated comment is available for the determined user based on the scope for viewing the generated comment. The GUI display module 620 is further configured to provide for display the generated comment restricted to the set of users if the generated comment is available for the determined user. In some configurations, the generated comment is associated with a respective access control list that includes a scope for viewing the generated comment data based on the set of users. The comments modules 615 is further configured to generate an entry in a new access control list including a scope for viewing the generated comment data based on the set of users in which the entry associates the comment to the new access control list.

As further shown in FIG. 6, each of the aforementioned modules can be configured to communicate between each other. For instance, different data, messages, API calls and returns can be passed between the different modules in the system 605.

The system 605 can communicate over a network 650 with a client computing device 660. The client computing device 660 can each be configured to communicate with the aforementioned modules of the system 605. For instance, the client computing device 660 can transmit comment data for one or more comments restricted to the set of users over the network 650 to the system 605. In response, the system 605 can generate and provide one or more comments restricted to the set of users over the network 650 to the client computing device 660. As further shown in FIG. 6, the system 605 can communicate over the network 650 with other client computing device(s) 670 in a similar manner (and vice versa).

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, a combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in a form of programming language, including compiled or interpreted languages, declarative or procedural languages, and it can be deployed in some form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

An API allows a developer of an API calling component (that could be a third party developer) to utilize specified features provided by an API implementing component. There may be one API calling component or there may be more than one such component. An API can be a source code interface that a computing system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some configurations the API implementing component may provide more than one API, each providing a different view of or with different aspects that access different aspects of the functionality implemented by the API implementing component. For example, one API of an API implementing component can provide a first set of functions and can be exposed to third party developers, and another API of the API implementing component can be hidden (not exposed) and provide a subset of the first set of functions and also provide another set of functions, such as testing or debugging functions which are not in the first set of functions. In other configurations the API implementing component may itself call one or more other components via an underlying API and thus be both an API calling component and an API implementing component.

An API defines the language and parameters that API calling components use when accessing and using specified features of the API implementing component. For example, an API calling component accesses the specified features of the API implementing component through one or more API calls or invocations (embodied for example by function or method calls) exposed by the API and passes data and control information using parameters via the API calls or invocations. The API implementing component may return a value through the API in response to an API call from an API calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API calling component) and an API implementing component. Transferring the API calls may include issuing, initiating, invoking, calling, receiving, returning, or responding to the function calls or messages. In other words, transferring can describe actions by either of the API calling component or the API implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API implementing component. The API calling component therefore can declare variables, use pointers to, use or instantiate constant values of such types or classes by using definitions provided in the API.

Generally, an API can be used to access a service or data provided by the API implementing component or to initiate performance of an operation or computation provided by the API implementing component. By way of example, the API implementing component and the API calling component may each be one of an operating system, a library, a device driver, an API, an application program, or other module (it should be understood that the API implementing component and the API calling component may be the same or different type of module from each other). API implementing components may in some cases be embodied at least in part in firmware, microcode, or other hardware logic. In some configurations, an API may allow a client program to use the services provided by a Software Development Kit (SDK) library. In other configurations an application or other client program may use an API provided by an Application Framework. In these configurations the application or client program may incorporate calls to functions or methods provided by the SDK and provided by the API or use data types or objects defined in the SDK and provided by the API. An Application Framework may in these configurations provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API calling component may be a local component (i.e., on the same data processing system as the API implementing component) or a remote component (i.e., on a different data processing system from the API-implementing component) that communicates with the API-implementing component through the API over a network. It should be understood that an API implementing component may also act as an API calling component (i.e., it may make API calls to an API exposed by a different API implementing component) and an API calling component may also act as an API implementing component by implementing an API that is exposed to a different API calling component.

The API can allow multiple API calling components written in different programming languages to communicate with the API implementing component (thus the API may include features for translating calls and returns between the API implementing component and the API calling component). The API however can be implemented in terms of a specific programming language. An API calling component can, in one configuration, call APIs from different providers such as a set of APIs from an OS provider and another set of APIs from a plug-in provider and another set of APIs from another provider (e.g. the provider of a software library) or creator of the another set of APIs.

The following description describes an example API architecture in which some configurations of the subject technology can be implemented.

Figure 7:
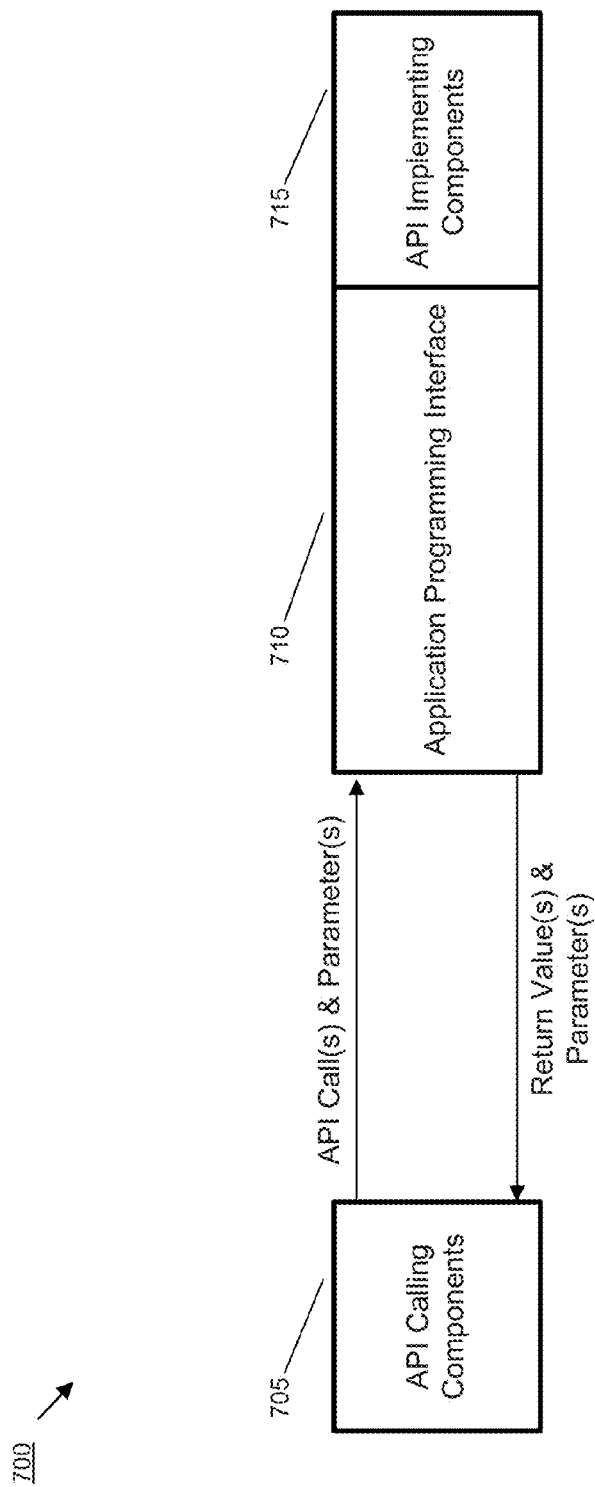
FIG. 7 conceptually illustrates an example application programming interface (API) architecture.

FIG. 7 is a block diagram illustrating an example API architecture, which can be used in some configurations of the subject technology. As shown in FIG. 7, the API architecture 700 includes the API implementing component 715 (e.g., an operating system, a library, a device driver, an API, an application program, software or other module) that implements the API 710. The API 710 specifies one or more functions, methods, classes, objects, protocols, data structures, formats and/or other features of the API-implementing component that can be used by the API-calling component 705. In one example, the API 710 can access a user's social graph (e.g., to provide an interaction between the user and one or more other users from the user social graph). The API 710 can specify at least one calling convention that specifies how a function in the API implementing component receives parameters from the API calling component and how the function returns a result to the API calling component. The API calling component 705 (e.g., an operating system, a library, a device driver, an API, an application program, software or other module), makes API calls through the API 710 to access and use the features of the API implementing component 715 that are specified by the API 710. The API implementing component 715 can return a value through the API 710 to the API calling component 705 in response to an API call.

It will be appreciated that the API implementing component 715 can include additional functions, methods, classes, data structures, and/or other features that are not specified through the API 710 and are not available to the API calling component 705. It should be understood that the API calling component 705 can be on the same system as the API implementing component 715 or can be located remotely and accesses the API implementing component 715 using the API 710 over a network. While FIG. 7 illustrates a single API calling component 705 interacting with the API 710, it should be understood that other API calling components, which can be written in different languages (or the same language) than the API calling component 705, can use the API 710.

The API implementing component 715, the API 710, and the API calling component 705 can be stored in a machine-readable medium, which includes a mechanism for storing information in a form readable by a machine (e.g., a computer or other data processing system). For example, a machine-readable medium includes magnetic disks, optical disks, random access memory, read only memory, flash memory devices, etc.

The following description describes an example system in which aspects of the subject technology can be implemented.

Figure 8:
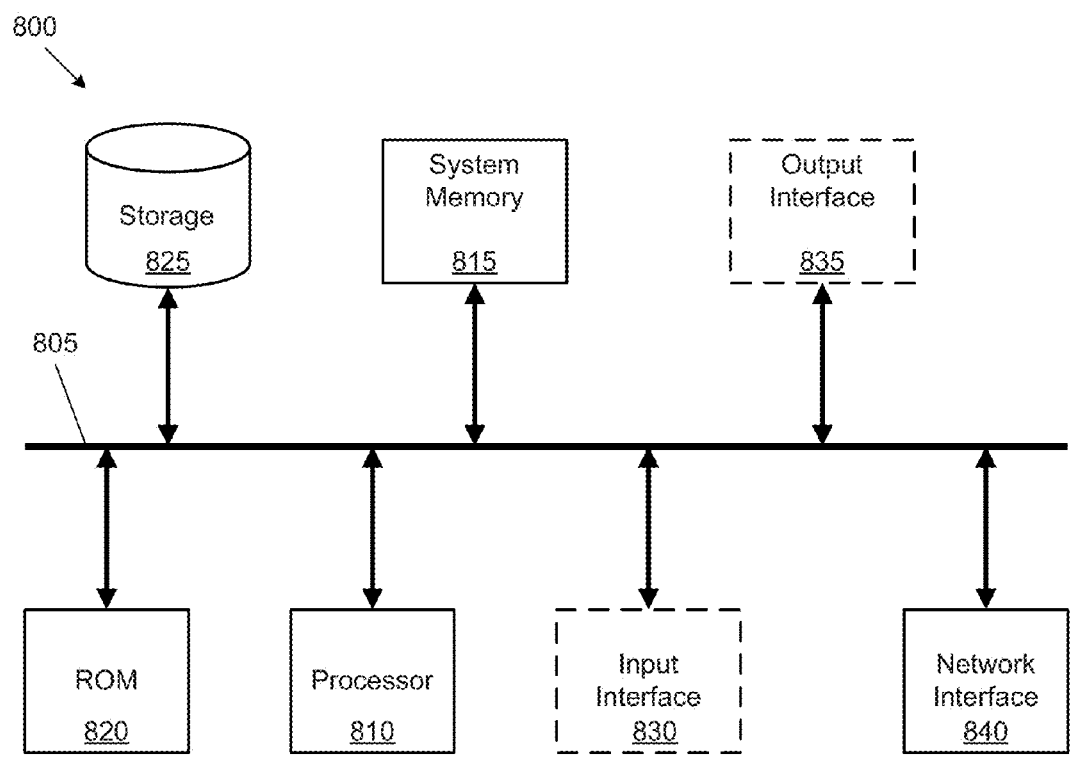
FIG. 8 conceptually illustrates a system with which some implementations of the subject technology may be implemented.

FIG. 8 conceptually illustrates a system 800 with which some implementations of the subject technology can be implemented. The system 800 can be a computer, phone, PDA, or another sort of electronic device. In some configurations, the system 800 includes a television with one or more processors embedded therein. Such a system includes various types of computer readable media and interfaces for various other types of computer readable media. The system 800 includes a bus 805, processing unit(s) 810, a system memory 815, a read-only memory 820, a storage device 825, an optional input interface 830, an optional output interface 835, and a network interface 840.

The bus 805 collectively represents all system, peripheral, and chipset buses that communicatively connect the numerous internal devices of the system 800. For instance, the bus 805 communicatively connects the processing unit(s) 810 with the read-only memory 820, the system memory 815, and the storage device 825.

From these various memory units, the processing unit(s) 810 retrieves instructions to execute and data to process in order to execute the processes of the subject technology. The processing unit(s) can be a single processor or a multi-core processor in different implementations.

The read-only-memory (ROM) 820 stores static data and instructions that are needed by the processing unit(s) 810 and other modules of the system 800. The storage device 825, on the other hand, is a read-and-write memory device. This device is a non-volatile memory unit that stores instructions and data even when the system 800 is off. Some implementations of the subject technology use a mass-storage device (such as a magnetic or optical disk and its corresponding disk drive) as the storage device 825.

Other implementations use a removable storage device (such as a flash drive, a floppy disk, and its corresponding disk drive) as the storage device 825. Like the storage device 825, the system memory 815 is a read-and-write memory device. However, unlike storage device 825, the system memory 815 is a volatile read-and-write memory, such a random access memory. The system memory 815 stores some of the instructions and data that the processor needs at runtime. In some implementations, the subject technology's processes are stored in the system memory 815, the storage device 825, and/or the read-only memory 820. For example, the various memory units include instructions for processing multimedia items in accordance with some implementations. From these various memory units, the processing unit(s) 810 retrieves instructions to execute and data to process in order to execute the processes of some implementations.

The bus 805 also connects to the optional input and output interfaces 830 and 835. The optional input interface 830 enables the user to communicate information and select commands to the system. The optional input interface 830 can interface with alphanumeric keyboards and pointing devices (also called "cursor control devices"). The optional output interface 835 can provide display images generated by the system 800. The optional output interface 835 can interface with printers and display devices, such as cathode ray tubes (CRT) or liquid crystal displays (LCD). Some implementations can interface with devices such as a touchscreen that functions as both input and output devices.

Finally, as shown in FIG. 8, bus 805 also couples system 800 to a network interface 840 through a network adapter (not shown). In this manner, the computer can be a part of a network of computers (such as a local area network ("LAN"), a wide area network ("WAN"), or an Intranet, or an interconnected network of networks, such as the Internet. The components of system 800 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and the claims of this application, the terms "computer", "server", "processor", and "memory" all refer to electronic or other technological devices. These terms exclude people or groups of people. For the purposes of the specification, the terms display or displaying means displaying on an electronic device. As used in this specification and the claims of this application, the terms "computer readable medium" and "computer readable media" are entirely restricted to tangible, physical objects that store information in a form that is readable by a computer. These terms exclude wireless signals, wired download signals, and other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be a form of sensory feedback, e.g., visual feedback, auditory feedback, or tactile feedback; and input from the user can be received in a form, including acoustic, speech, or tactile input. In addition, a computer can interact with a user by sending documents to and receiving documents from a device that is used by the user: for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or a combination of one or more such back end, middleware, or front end components. The components of the system can be interconnected by a form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that a specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable a person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

What is claimed is:

1. A machine-implemented method, the method comprising:
    determining one or more public comments provided in a web page, the one or more public comments comprising a first format for providing public commenting by one or more viewers of the web page, the first format being provided by a first service which is associated with the web page and which does not natively support user interaction with a social graph;
    receiving comment data, the comment data being in response to a respective public comment among the determined one or more public comments;
    receiving a selection of a set of users that defines a scope for viewing the received comment data;
    generating a comment thread restricted to the set of users based on the scope for viewing the received comment data, the generated comment thread comprising a second format for providing commenting restricted to the set of users, the second format being associated with a second service for permitting access to the social graph; and
    providing the generated comment thread restricted to the set of users for display in the web page, the generated comment thread with the second format being integrated within content of the determined one or more public comments with the first format.

2. The method of claim 1, wherein the generated comment thread is displayed separately to distinguish from the determined one or more public comments.

3. The method of claim 1, further comprising:
    determining a user corresponding to a current viewer the web page;

determining if the generated comment thread is available for the determined user based on the scope for viewing the received comment data; and providing for display the generated comment thread restricted to the set of users if the generated comment thread is available for the determined user.

4. The method of claim 3, wherein the user is determined based on one or more login credentials of the current viewer of the web page.

5. The method of claim 3, wherein the user is determined based on a corresponding online social networking profile.

6. The method of claim 1, wherein the generated comment thread is associated with a respective access control list that includes a scope for viewing the generated comment thread based on the set of users.

7. The method of claim 1, wherein generating the comment thread restricted to the set of users comprises:

generating an entry in a new access control list including a scope for viewing the generated comment thread based on the set of users, wherein the entry associates the generated comment thread to the new access control list.

8. The method of claim 1, wherein the selection of the set of users comprises selecting a group of users.

9. The method of claim 8, wherein the group of users is defined by social circle in an online social networking service.

10. The method of claim 1, wherein the first format is native to the web page.

11. The method of claim 1, wherein the second format is provided by an application which is associated with the web page.

12. The method of claim 11, wherein the application comprises a widget provided as a plugin or extension in a web browser.

13. The method of claim 11, wherein the application is integrated in the web page.

14. The method of claim 1, wherein the set of users comprises a single user, a group of users, a set of groups, or an organization.

15. The method of claim 1, wherein the set of users are associated with a respective access control list that defines the scope for viewing the received comment data.

16. The method of claim 15, wherein the scope for viewing the received comment data includes one or more unique users.

17. The method of claim 1, further comprising:

determining one or more public comments on the web page; and providing for display the determined one or more public comments, wherein the displayed public comments are displayed separately from the generated comment thread.

18. A system for determining access to comments, the system comprising:

one or more processors; and a machine-readable medium comprising instructions stored therein, which when executed by the processors, cause the processors to perform operations comprising:

determining a user corresponding to a current viewer of web content on a web page;

determining one or more public comments provided in the web page, the one or more public comments comprising a first format for providing public commenting by one or more viewers of the web page, the first format being provided by a first service which is associated with the web page and which does not natively support user interaction with a social graph;

receiving comment data, the comment data being in response to a respective public comment among the determined one or more public comments;

receiving a selection of a set of users that defines a scope for viewing the received comment data;

generating a comment thread restricted to the set of users based on the scope for viewing the received comment data, the generated comment thread comprising a second format for providing commenting restricted to the set of users, the second format being associated with a second service for permitting access to the social graph; and providing the determined one or more public comments and the generated comment thread for display in the web page, the generated comment thread being displayed separately to distinguish from the determined one or more public comments, the generated comment thread with the second format being integrated within content of the determined one or more public comments with the first format.

19. The system of claim 18, wherein the operations further comprising:

determining if the generated comment thread is available for the determined user based on the scope for viewing the generated comment thread.

20. The system of claim 19, wherein the operations further comprise:

providing for display the generated comment thread restricted to the set of users if the generated comment thread is available for the determined user.

21. The system of claim 18, wherein the generated comment thread is associated with a respective access control list that includes a scope for viewing the generated comment thread based on the set of users.

22. The system of claim 18, wherein the operations further comprise:

generating an entry in a new access control list including a scope for viewing the generated comment thread based on the set of users, wherein the entry associates the generated comment thread to the new access control list.

23. The system of claim 18, wherein the selection of the set of users comprises selecting a group of users.

24. The system of claim 23, wherein the group of users is defined by social circle in an online social networking service.

25. The system of claim 18, wherein the first format is native to the web page.

26. The system of claim 18, wherein the second format is provided by an application which is associated with the web page.

27. The system of claim 26, wherein the application comprises a widget provided as a plugin or extension in a web browser.

28. The system of claim 26, wherein the application is integrated in the web page.

29. The system of claim 18, wherein the operations further comprise:

performing a search request of available comments for the web content to determine if the user is included in a respective access control list for viewing a respective comment restricted to the set of users.

30. The system of claim 18, wherein the operations further comprise:

providing for display the determined one or more public comments, wherein the displayed public comments are displayed separately from one or more comments restricted to the set of users.

31. A non-transitory machine-readable medium comprising instructions stored therein, which when executed by a machine, cause the machine to perform operations comprising:

determining one or more public comments provided in a web page, the one or more public comments comprising a first format for providing public commenting by one or more viewers of the web page, the first format being provided by a first service which is associated with the web page and which does not natively support user interaction with a social graph;

receiving comment data, the comment data being in response to a respective public comment among the determined one or more public comments;

receiving a selection of a set of users that defines a scope for viewing the received comment data, the set of users including one or more unique contacts among one or more contacts of the social graph; and generating a comment thread restricted to the set of users based on the scope for viewing the received comment data, the generated comment thread comprising a second format for providing commenting restricted to the set of users that is compatible with the social graph and incompatible with the first format for providing public commenting, the second format being associated with a second service for permitting access to the social graph, the generated comment thread with the second format being integrated within content of the determined one or more public comments with the first format.

* * * * *